(12) United States Patent
Komatsu et al.

(10) Patent No.: US 9,080,670 B2
(45) Date of Patent: Jul. 14, 2015

(54) POWER TRANSMISSION DEVICE (75) Inventors: Takuya Komatsu, Anjo (JP); Tomoo Atarashi, Kariya (JP); Tatsuya Ishikawa, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 487 days.

(21) Appl. No.: 13/233,349

(22) Filed: Sep. 15, 2011

(65) Prior Publication Data

US 2012/0067153 A1 Mar. 22, 2012

(30) Foreign Application Priority Data

Sep. 22, 2010 (JP) ................................. 2010-211911

(51) Int. Cl.
 *B60W 10/04* (2006.01)
 *F16H 63/34* (2006.01)
 *F16H 61/32* (2006.01)

(52) U.S. Cl.
 CPC .............. *F16H 61/32* (2013.01); *B60K 41/085* (2013.01); *F16H 63/34* (2013.01); *F16H 63/3425* (2013.01); *F16H 63/3458* (2013.01); *F16H 63/3466* (2013.01); *F16H 2061/326* (2013.01);
 (Continued)

(58) Field of Classification Search
 CPC .... B60K 41/08; B60K 41/082; B60K 41/085; F16H 63/3416; F16H 63/3458; F16H 63/3466; F16H 63/3475; F16H 63/3425; F16H 63/3433; F16H 63/48; F16H 63/483; F16H 63/486; F16H 61/32; F16H 2061/326
 USPC ................. 74/473.1, 473.12, 473.21, 473.24, 74/473.25, 473.26
 See application file for complete search history.

(56) References Cited

U.S. PATENT DOCUMENTS 5,531,303 A * 7/1996 Raszkowski ............... 192/219.5
5,630,339 A * 5/1997 Tuday .......................... 74/577 R
6,279,713 B1 * 8/2001 Young et al. ............... 192/219.5
(Continued)

FOREIGN PATENT DOCUMENTS

JP A-2002-310295 10/2002
JP A-2003-185013 7/2003
(Continued)

OTHER PUBLICATIONS

Dec. 13, 2011 (mail date) International Search Report issued in International Application No. PCT/JP2011/005241 (with translation).

*Primary Examiner* — Justin Krause
*Assistant Examiner* — Gregory Prather
(74) *Attorney, Agent, or Firm* — Oliff PLC (57) ABSTRACT A power transmission device for a vehicle configured with a rotary power member, and a mechanism configured with a plurality of operational states. A switching shaft changes the operational state of the operating mechanism and is moved by an electric actuator. A control transmission transmits the power from the actuator to the shaft. The housing for the rotary member includes is configured so that the switching shaft projects outwards from the housing. The electric actuator is arranged at a location facing, of a surface of the housing portion of the case, a portion that does not overlap another portion where the switching shaft projects, when viewed in the axial direction of the rotational axis of the rotary member. A part of the actuator is arranged on a case side relative to a vertical line passing through the portion where the switching shaft projects from the housing portion of the case.

12 Claims, 6 Drawing Sheets (52) U.S. Cl.
CPC ........ *Y10T 74/2003* (2015.01); *Y10T 74/20085* (2015.01)

(56) References Cited

U.S. PATENT DOCUMENTS

| | | | | |
|---|---|---|---|---|
| 6,779,619 | B2 * | 8/2004 | Thomas | 180/65.245 |
| 6,964,213 | B2 * | 11/2005 | Newman et al. | 74/530 |
| 7,624,657 | B2 * | 12/2009 | Safran et al. | 74/89.17 |
| 2007/0007055 | A1 * | 1/2007 | Schmidt et al. | 180/65.2 |
| 2009/0241715 | A1 | 10/2009 | Tanaka et al. | |
| 2010/0108460 | A1 * | 5/2010 | Nakamura et al. | 192/219.5 |
| 2010/0186531 | A1 | 7/2010 | Miyagawa et al. | |

FOREIGN PATENT DOCUMENTS

| | | |
|---|---|---|
| JP | A-2008-002561 | 1/2008 |
| JP | A-2009-092134 | 4/2009 |
| JP | A-2009-243516 | 10/2009 |

* cited by examiner

POWER TRANSMISSION DEVICE

INCORPORATION BY REFERENCE

The disclosure of Japanese Patent Application No. 2010-211911 filed on Sep. 22, 2010 including the specification, drawings and abstract is incorporated herein by reference in its entirety.

BACKGROUND OF THE INVENTION

The present invention relates to a power transmission device.

DESCRIPTION OF THE RELATED ART

Conventionally, devices that transmit power, such as a vehicle automatic transmission and a power transmission device for a hybrid electric vehicle that uses an internal combustion engine and an electric motor in combination, have been used. Such a power transmission device is provided with operating mechanisms that perform various operations, such as a parking lock mechanism that mechanically locks a certain rotary member (such as a gear) in a power transmission path, and a speed change mechanism that changes the speed ratio. A user can control the operational states of such operating mechanisms (for example, the locking status of the parking lock mechanism and the speed ratio status of the speed change mechanism) by operating an operating member (such as a shift lever or a shift switch). Here, a system (also referred to as a "shift-by-wire" system) that electrically detects the operation of the operating member and controls the operational state of the operating mechanism by using an electric actuator (such as an electric motor) is used. If the shift-by-wire system is used, the degree of freedom both in layout and operating method of the operating member can be increased.

SUMMARY OF THE INVENTION

However, in some cases, providing an additional electric actuator has increased the size of the power transmission device. As a matter of fact, no sufficient contrivance has been made in the layout of the electric actuator so as to suppress the size of the power transmission device from increasing.

The main advantage of the present invention is to provide a technology that can suppress the size of the power transmission device from increasing.

The present invention has been made in order to solve at least a part of the problem described above, and can be embodied as modes or aspects given below.

[First Aspect]

According to a first aspect of the present invention, a power transmission device for a vehicle includes a rotary member that rotates for transmitting power, an operating mechanism that is capable of having a plurality of operational states including a first operational state and a second operational state, a switching shaft that switches the operational state of the operating mechanism, an electric actuator that produces power for operating the switching shaft, a control transmission mechanism that transmits the power of the electric actuator to the switching shaft, and a case that houses at least the rotary member. In the power transmission device for a vehicle, the case includes a housing portion that houses at least a part of the rotary member in a portion covering the rotary member in a direction perpendicular to a rotational axis of the rotary member; the switching shaft projects from the housing portion of the case toward the outside of the housing portion; the electric actuator is arranged at a location facing, of a surface of the housing portion of the case, a portion that does not overlap another portion where the switching shaft projects, when viewed in the axial direction of the rotational axis of the rotary member. Further; at least a part of the electric actuator is arranged on a case side relative to a vertical line passing through the portion where the switching shaft projects from the housing portion of the case, when viewed in the axial direction of the rotational axis of the rotary member, and at least a part of the electric actuator is arranged so as to overlap the housing portion of the case, when viewed in the axial direction of the switching shaft.

With this structure, the electric actuator is arranged at a location facing a different portion of the surface of the housing portion from the portion where the switching shaft projects, and at least a part of the electric actuator is arranged on the side of the case relative to the vertical line passing through the portion where the switching shaft projects from the housing portion, when viewed in the axial direction of the rotational axis of the rotary member. In addition, when viewed in the axial direction of the switching shaft, at least a part of the electric actuator is arranged so as to overlap the housing portion of the case. Therefore, the possibility of increase in the horizontal size of the power transmission device can be reduced compared to the case in which the electric actuator is arranged on the extended line from the switching shaft.

[Second Aspect]

In the power transmission device according to the first aspect, the switching shaft may be a rotating shaft that rotates to switch the operational state of the operating mechanism, and the electric actuator may include an output rotating shaft that is in parallel with the switching shaft.

With this structure, the control transmission mechanism is only necessary to transmit rotation between the two parallel rotating shafts (the switching shaft and the output rotating shaft of the electric actuator). Therefore, the structure of the control transmission mechanism can be more simplified than in the case in which the rotating shaft of the electric actuator is arranged in a twisted position relative to the switching shaft. Consequently, the possibility of increase in the size of the control transmission mechanism can be reduced. As a result, the possibility of increase in the size of the power transmission device can be reduced.

[Third Aspect]

The power transmission device according to the first aspect or the second aspect may further include an actuator driving circuit that drives the electric actuator. In addition, the electric actuator may be arranged on one side of the control transmission mechanism, and the actuator driving circuit is arranged on the side opposite to the electric actuator with respect to the control transmission mechanism.

With this structure, the actuator driving circuit and the electric actuator are separated by the control transmission mechanism provided therebetween. Therefore, it becomes less possible that the heat produced in one of the actuator driving circuit and the electric actuator increases the temperature of the other. Consequently, it is unnecessary to provide a large cooling device (such as a heat releasing device) so as to cool each of the actuator driving circuit and the electric actuator. As a result, the possibility of increase in the size of the power transmission device can be reduced.

[Fourth Aspect]

In the power transmission device according to the third aspect, when the power transmission device is mounted on the vehicle, the housing portion may be arranged on a side in a forward direction of the vehicle relative to the power transmission device, the switching shaft may project toward the side in the forward direction relative to the housing portion, and the actuator driving circuit may be arranged on the side in the forward direction relative to the control transmission mechanism.

With this structure, when the vehicle travels forward, the wind flowing from the front of the vehicle can cool the actuator driving circuit. Consequently, it is unnecessary to provide a large cooling device (such as a heat releasing device) so as to cool the actuator driving circuit. As a result, the possibility of increase in the size of the power transmission device can be reduced.

[Fifth Aspect]

In the power transmission device according to any one of the first aspect to the fourth aspect, the housing portion of the case may include an inclined portion inclined obliquely downward from the portion where the switching shaft projects toward the inside of the power transmission device, when viewed in the axial direction of the rotational axis of the rotary member, and the electric actuator may be arranged below the inclined portion of the housing portion.

With this structure, when the vehicle travels, the wind flowing between the vehicle and the ground surface can cool the electric actuator. Consequently, it is unnecessary to provide a large cooling device (such as a heat releasing device) so as to cool the electric actuator. As a result, the possibility of increase in the size of the power transmission device can be reduced.

Note that the present invention can be embodied in various modes, and for example, can be embodied in modes, such as a power transmission method or device for transmitting power from at least one of an internal combustion engine and an electric motor, and a vehicle equipped with that power transmission device.

DETAILED DESCRIPTION OF THE EMBODIMENT

An embodiment of the present invention will be described next based on a first example and modification examples.

A. First Example

Figure 1:
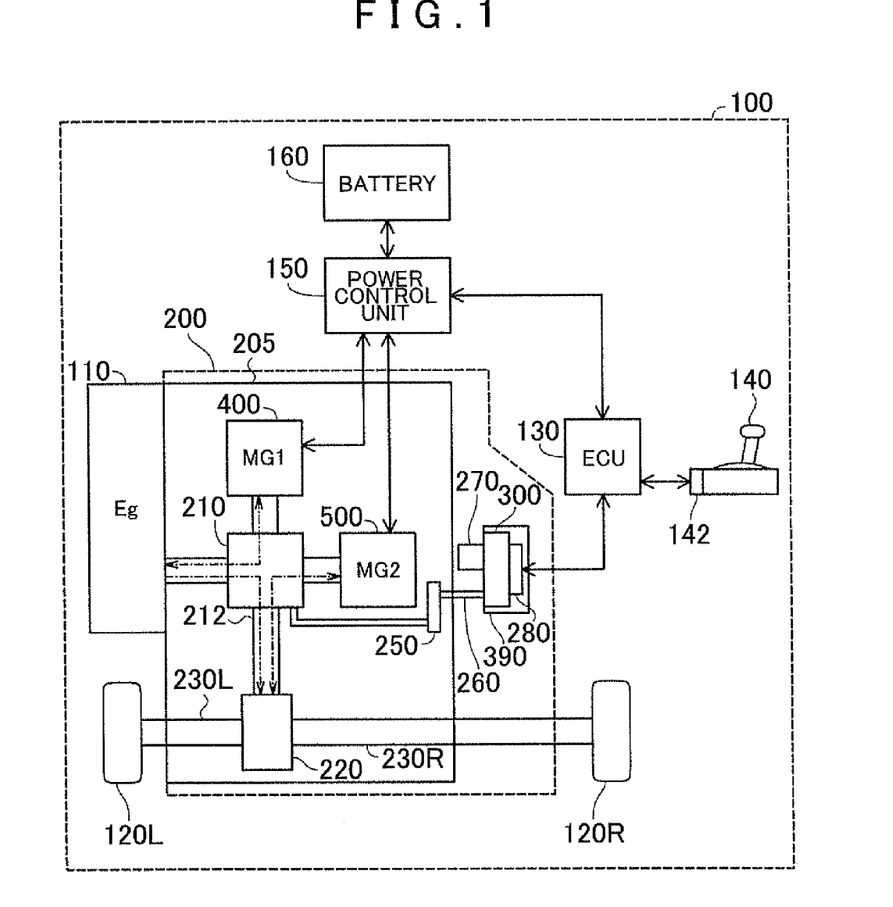
FIG. 1 is a block diagram showing a vehicle serving as an example of the present invention.

FIG. 1 is a block diagram showing a vehicle serving as an example of the present invention. This vehicle 100 is a so-called hybrid electric vehicle that uses an internal combustion engine 110 and an electric motor 500 as sources of power. As shown in the diagram, the vehicle 100 has the internal combustion engine 110, a power transmission device 200 connected to the internal combustion engine 110, driving wheels 120L and 120R connected to the power transmission device 200 via drive shafts 230L and 230R, respectively, a power control unit 150, a battery 160, an electronic control unit 130, and a shift lever 140.

The power transmission device 200 has a generator 400, the electric motor 500, a power split mechanism 210, a differential gear 220, and a locking mechanism 250. These elements 200, 400, 500, 210, 220, and 250 are housed in a case 205. The power transmission device 200 further has a switching shaft 260 (also referred to as a "manual shaft") connected to the locking mechanism 250, a control transmission mechanism 300 connected to the switching shaft 260, an electric motor 270 connected to the control transmission mechanism 300, and a driving circuit 280 that drives the electric motor 270. The driving circuit 280 is an electronic circuit that controls the amount and direction of current flowing in the electric motor 270, and includes switching elements such as FETs (field effect transistors) and IGBTs (insulated gate bipolar transistors). The control transmission mechanism 300 and the driving circuit 280 are housed in the box 390. The elements 300, 270, and 280 are arranged outside of the case 205.

The locking mechanism 250 can lock (disable rotation of) the driving wheels 120L and 120R of the vehicle 100 (as will be described later in detail).

The power split mechanism 210 is a so-called planetary gear mechanism (not shown) that has a sun gear, a plurality of pinions (also referred to as "planetary gears") arranged around the sun gear so as to mesh therewith, a carrier supporting the plurality of pinions in a rotatable and revolvable manner, and a ring gear having internal teeth meshing with the plurality of pinions. In the present example, the internal combustion engine 110 is connected to the carrier; the generator 400 is connected to the sun gear; and the electric motor 500 and a drive shaft 212 are connected to the ring gear.

The power split mechanism 210 can distribute (split) the power from the internal combustion engine 110 between the generator 400 and the drive shaft 212 connected to the differential gear 220. The generator 400 can also operate as an electric motor. When the internal combustion engine 110 is started, the power split mechanism 210 transmits the power from the generator 400 to the internal combustion engine 110. The power split mechanism 210 also transmits the power from the electric motor 500 to the differential gear 220. During deceleration, the power split mechanism 210 can transmit the power from the differential gear 220 to the electric motor 500. The electric motor 500 can recover energy by operating as a generator.

The power control unit 150 has an inverter circuit that controls the generator 400 and the electric motor 500, and also has a converter circuit that raises and lowers voltage. By using the power from the battery 160, the power control unit 150 can drive the electric motor 500 and can also drive the generator 400 as a motor. Moreover, the power control unit 150 can charge the battery 160 by using the power from the generator 400, and can also charge the battery 160 by using the power from the electric motor 500 that is used as a generator. As described above, the generator 400 can also operate as an electric motor. Accordingly, the generator 400 will be hereinafter referred to as a "first motor-generator MG1" as well. In addition, as described above, the electric motor 500 can also operate as a generator. Accordingly, the electric motor 500 will be hereinafter referred to as a "second motor-generator MG2" as well.

The electronic control unit 130 is a computer that controls the power control unit 150 and the driving circuit 280. Although not shown in the diagram, the electronic control unit 130 has a central processing unit (CPU), memories such as a ROM (read only memory) and a RAM (random access memory), an input-output interface for using various signals, an analog-to-digital converter, and a digital-to-analog converter. The CPU achieves various functions for controlling the power control unit 150 and the driving circuit 280 by executing programs stored in the memory.

The shift lever 140 is an operating member operated by a user. The user can set the position of the shift lever 140 to any one of a plurality of shift ranges (for example, four shift ranges including forward [D], reverse [R], neutral [N], and parking [P] ranges). The shift lever 140 is provided with a position sensor 142, which supplies a signal representing a position in which the shift lever 140 is set. The electronic control unit 130 controls the driving circuit 280 and the power control unit 150 according to the received signal (the position of the shift lever 140).

When the shift lever 140 is positioned in the parking range, the electronic control unit 130 controls the driving circuit 280 so that the locking mechanism 250 locks the driving wheels 120L and 120R. On the other hand, when the shift lever 140 is positioned in another range different from the parking range, the electronic control unit 130 controls the driving circuit 280 so that the locking mechanism 250 does not lock the driving wheels 120L and 120R. Note that a control of the power control unit 150 performed by the electronic control unit 130 may be a well-known control.

Figure 2:
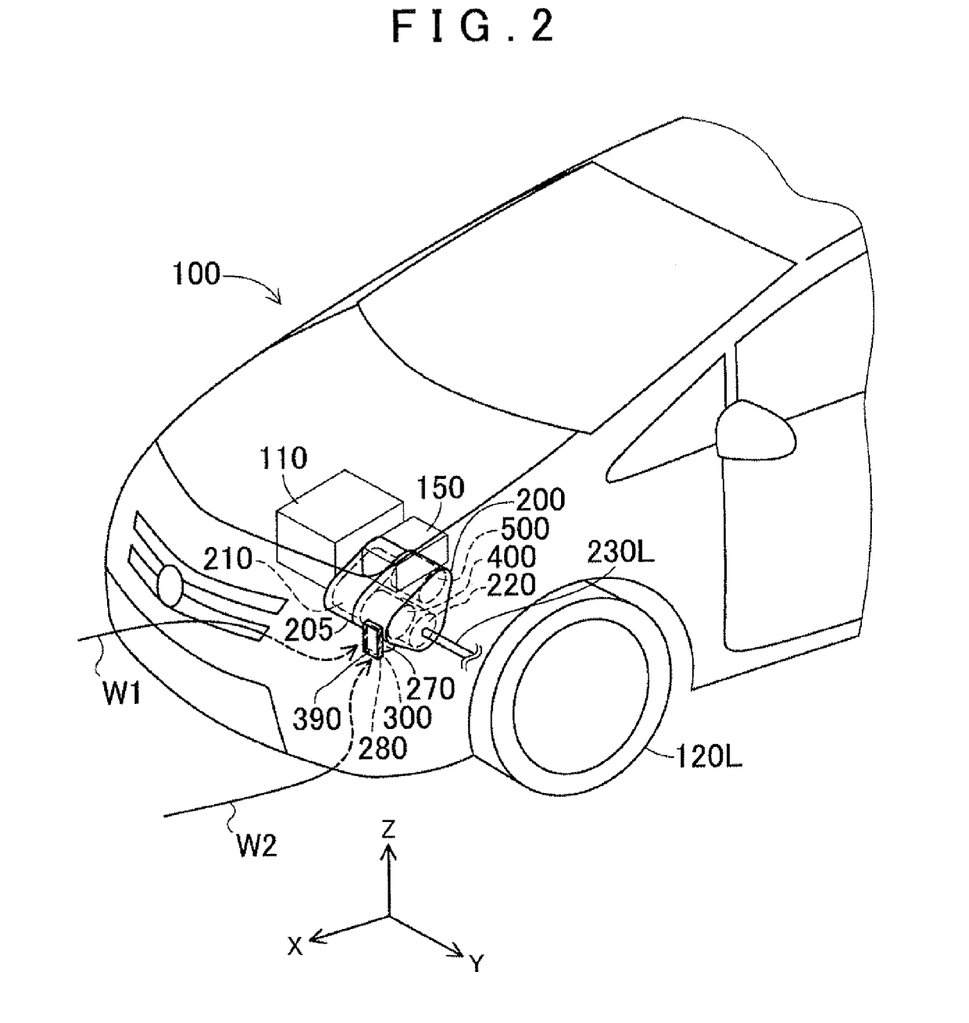
FIG. 2 is a perspective view of the vehicle 100.

FIG. 2 is a perspective view of the vehicle 100. In the drawing, the X direction denotes the forward direction of the vehicle 100; the Z direction denotes the vertical upward direction; and the Y direction denotes the direction perpendicular to both the X and Z directions (here, the left-hand direction when viewed from the user facing in the X direction). The drawing also shows the internal combustion engine 110, the power transmission device 200, and the power control unit 150 arranged in the vehicle 100. A first wind W1 in the drawing represents a wind flowing from the front end of the vehicle 100 into the vehicle 100 when the vehicle 100 travels forward. A second wind W2 represents a wind flowing from a space between the vehicle 100 and the ground surface (not shown) into the vehicle 100 when the vehicle 100 travels forward.

In the present example, as shown in the drawing, the power transmission device 200, the power control unit 150, and the internal combustion engine 110 are arranged in the front portion of the vehicle 100. The driving wheels 120L and 120R correspond to front wheels of the vehicle 100. In the present example, the power control unit 150 is arranged above the power transmission device 200, and the internal combustion engine 110 is arranged on the lateral side (in the −Y direction) of the power transmission device 200. The inside of the case 205 of the power transmission device 200 is arranged on the −Y side thereof with the power split mechanism 210, and arranged on the +Y side thereof, with the generator 400, the electric motor 500, and the differential gear 220.

Figure 3A:
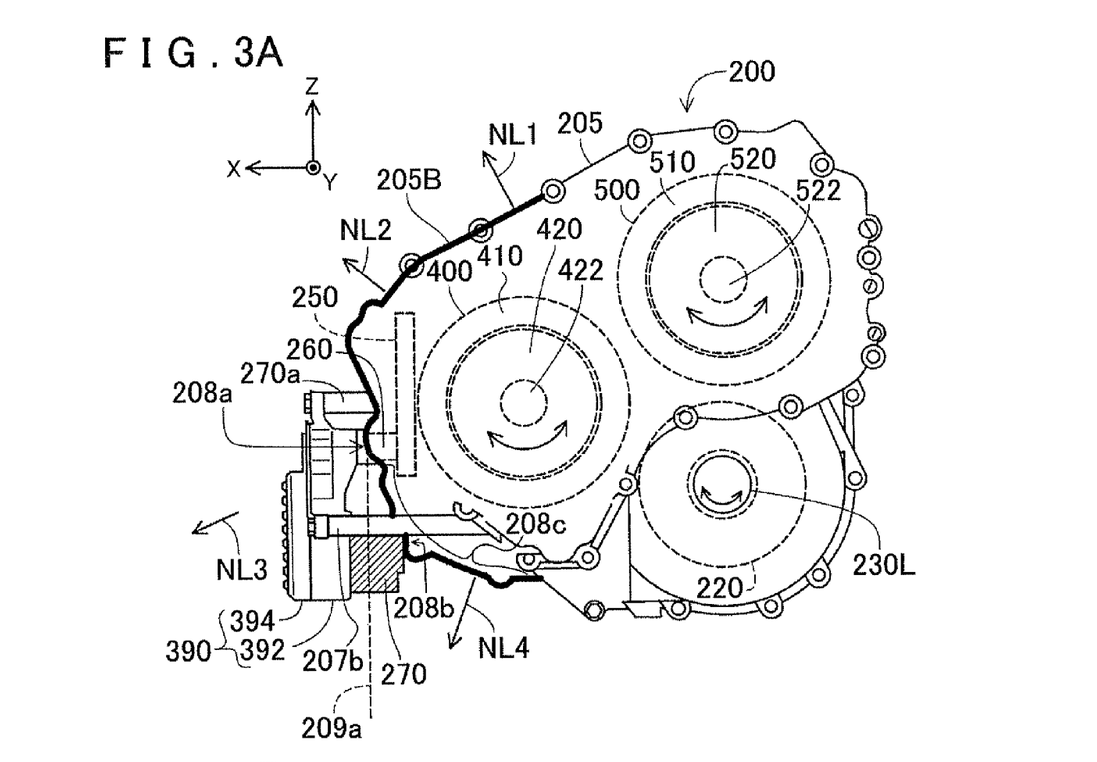
FIG. 3A shows a side view of a power transmission device 200.
Figure 3B:
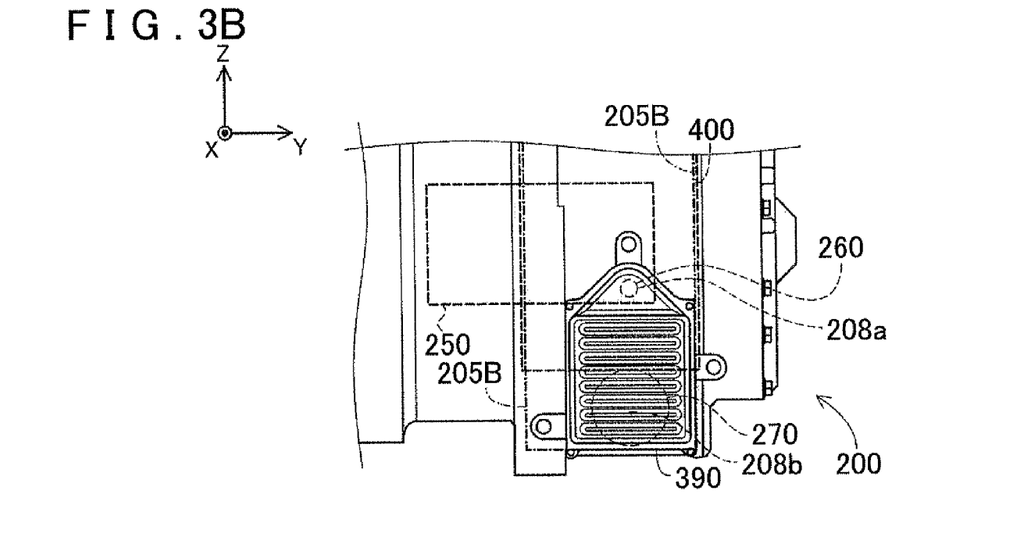
FIG. 3B shows a front view of a part of the power transmission device 200.

FIG. 3A is a side view of the power transmission device 200 viewed from the +Y side toward the −Y side. FIG. 3B is a front view of a part of the power transmission device 200 viewed from the front (+X side) toward the rear (−X side). In these drawings, the dotted lines indicate the differential gear 220, the generator 400, the electric motor 500, and the locking mechanism 250 that are housed inside the case 205. The directions X, Y, and Z in the drawings indicate the directions in the state in which the power transmission device 200 is mounted on the vehicle 100. Also in other drawings to be explained below, the directions X, Y, and Z shown in the drawings will indicate the directions in the state in which the power transmission device 200 is mounted on the vehicle 100.

As shown in the drawing, the differential gear 220 is arranged in a lower portion of the power transmission device 200. The electric motor 500 is arranged above the differential gear 220. The generator 400 is arranged on the front side (+X side) of the space between the differential gear 220 and the electric motor 500. The locking mechanism 250 is arranged on the front side (+X side) of the generator 400.

From the differential gear 220, the left-hand drive shaft 230L projects in the +Y direction, and the right-hand drive shaft 230R (not shown) projects in the −Y direction. The drive shafts 230L and 230R are approximately in parallel with the Y direction. The electric motor 500 has a stator 510 and a rotor 520. A rotating shaft 522 of the rotor 520 is approximately in parallel with the Y direction. The generator 400 has a stator 410 and a rotor 420. A rotational axis 422 of the rotor 420 is approximately in parallel with the Y direction.

As described above, the differential gear 220, the generator 400, and the electric motor 500 have the rotary members (the drive shaft 230L, the rotor 420, and the rotor 520, respectively) rotating about the rotating shaft approximately in parallel with the Y direction, and has a cylindrical shape (in FIGS. 3A and 3B, each of the differential gear 220, the generator 400, and the electric motor 500 is shown in a generally circular shape). Moreover, as shown in FIG. 3A, when viewed in the Y direction (for example, when viewed from the +Y side toward the −Y side), a portion of the case 205 that houses the elements 220, 400, and 500 has a generally triangular shape with rounded corners, and surrounds the elements 220, 400, and 500.

Particularly, as shown in FIG. 3A, a portion 205B (hereinafter referred to as a "housing portion 205B" as well) that houses a part of the +X side of the generator 400 has a generally convex shape projecting in the +X direction. In FIG. 3A, the surface of the housing portion 205B is indicated by a thick line. In the housing portion 205B, the direction of normal line to the surface of the housing portion 205B gradually changes. Specifically, as shown in FIG. 3A, when the surface of the housing portion 205B is traced from the top to the bottom thereof, the direction of the normal line changes from generally upward NL1, to obliquely upward NL2, to obliquely downward NL3, and finally to generally downward NL4.

As shown in FIG. 3A, the switching shaft 260 (that is approximately in parallel with the X direction) projects in the +X direction from an intermediate portion of the generally convex shape (a portion between one end (upper end) and the other end (lower end) of the generally convex shape) of the housing portion 205B. A portion 208a in FIGS. 3A and 3B represents the portion where the switching shaft 260 projects from the housing portion 205B of the case 205 (from the surface (outer surface) of the housing portion 205B of the case 205). On the +X side of the housing portion 205B, the box 390 is fastened with screws to bosses 207a and 207b provided on the case 205. The switching shaft 260 is inserted in the box 390. As will be described later, the box 390 houses the driving circuit 280 and the control transmission mechanism 300. The electric motor 270 is fixed on the box 390 below the switching shaft 260. The electric motor 270 is fixed to the box 390 on the case 205 side.

Figure 4:
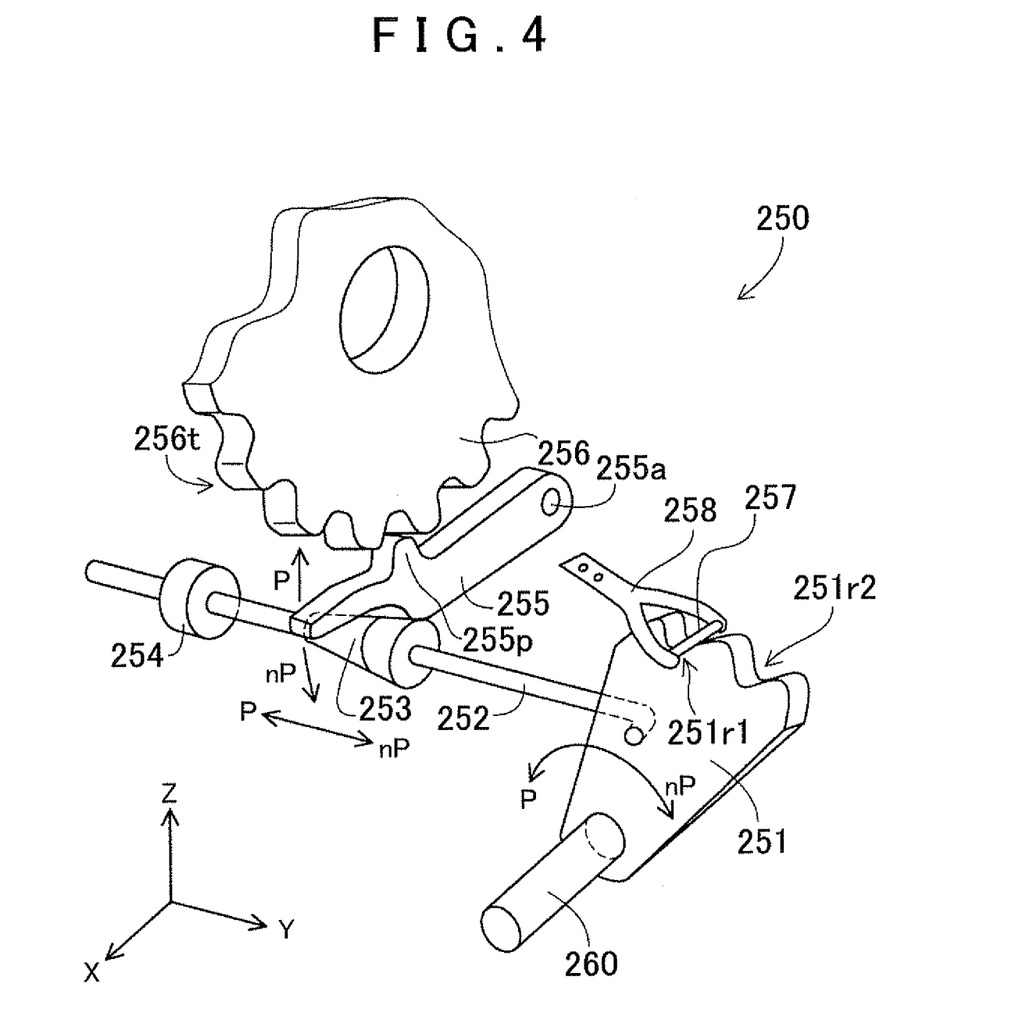
FIG. 4 is a perspective view schematically illustrating a structure of a locking mechanism 250.

FIG. 4 is a perspective view schematically illustrating a structure of the locking mechanism 250. The locking mechanism 250 includes: the switching shaft 260 extending in parallel with the X direction; a lever 251 that is fixed to the switching shaft 260 and extends upward from the switching shaft 260; a rod 252 that is connected at one end thereof to the lever 251 and extends in the −Y direction; a support portion 254 slidably supporting the other end of the rod 252; a cam 253 of a generally circular cone shape fixed to the rod 252; a locking lever 255 with one end thereof in contact with the upper portion of the cam 253 and the other end thereof rotatably supported by a shaft 255a; a parking gear 256 arranged above the locking lever 255; a roller 257 arranged above the lever 251; and a leaf spring 258 urging the roller 257 downward (in the −Z direction). The cam 253 has a generally circular cone shape whose radius is the larger the closer to the lever 251. The support portion 254, the shaft 255a, and the leaf spring 258 are fixed to the case 205 of the power transmission device 200.

The upper portion (+Z side) of the locking lever 255 is provided with a projecting portion 255p. The projecting portion 255p faces gear teeth 256t of the parking gear 256. As will be described later, the projecting portion 255p moves upward to engage with the gear teeth 256t, resulting in locking of the parking gear 256. The parking gear 256 is connected to a member that rotates in conjunction with the driving wheels 120L and 120R (FIG. 1). Therefore, locking (or releasing) of the parking gear 256 locks (or releases) the driving wheels 120L and 120R. Note that, in the present example, the parking gear 256 is connected to the ring gear (not shown) of the power split mechanism 210 (FIG. 1). Because the drive shaft 212 is connected to the ring gear as described above, locking (or releasing) of the parking gear 256 locks (or releases) the driving wheels 120L and 120R. Note that the parking gear 256 may be connected to any member that rotates in conjunction with the driving wheels 120L and 120R. For example, the parking gear 256 may be connected to a member (not shown) fixed to the rotating shaft of the electric motor 500, or may be connected to a member (not shown) fixed to the drive shaft 212.

The upper end surface of the lever 251 is processed into a smooth wave form, having two concave portions 251r1 and 251r2. The roller 257 presses downward the upper end surface of the lever 251, and thereby, accurately holds the rotational position of the lever 251 either in the position where the roller 257 comes in the first concave portion 251r1, or in the position where the roller 257 comes in the second concave portion 251r2.

If the switching shaft 260 rotates counterclockwise when viewed from the +X side toward the −X side, the rod 252, that is, the cam 253 moves in the −Y direction. The movement of the cam 253 in the −Y direction rotates the locking lever 255 upward. Due to this rotation, the projecting portion 255p of the locking lever 255 engages with the gear teeth 256t of the parking gear 256, thereby locking the parking gear 256. If the switching shaft 260 rotates in the opposite direction, the cam 253 moves in the +Y direction, and thereby, rotates the locking lever 255 downward. Due to this rotation, the projecting portion 255p of the locking lever 255 moves away from the gear teeth 256t of the parking gear 256, thereby making the parking gear 256 rotatable. Hereinafter, among the directions of operation (rotation or travel) of each of various elements (such as the elements 260, 252, 253, and 255), an operational direction for locking the parking gear 256 will also be referred to as a locking direction P, whereas an operational direction for releasing the parking gear 256 will also be referred to as an unlocking direction nP.

Figure 5:
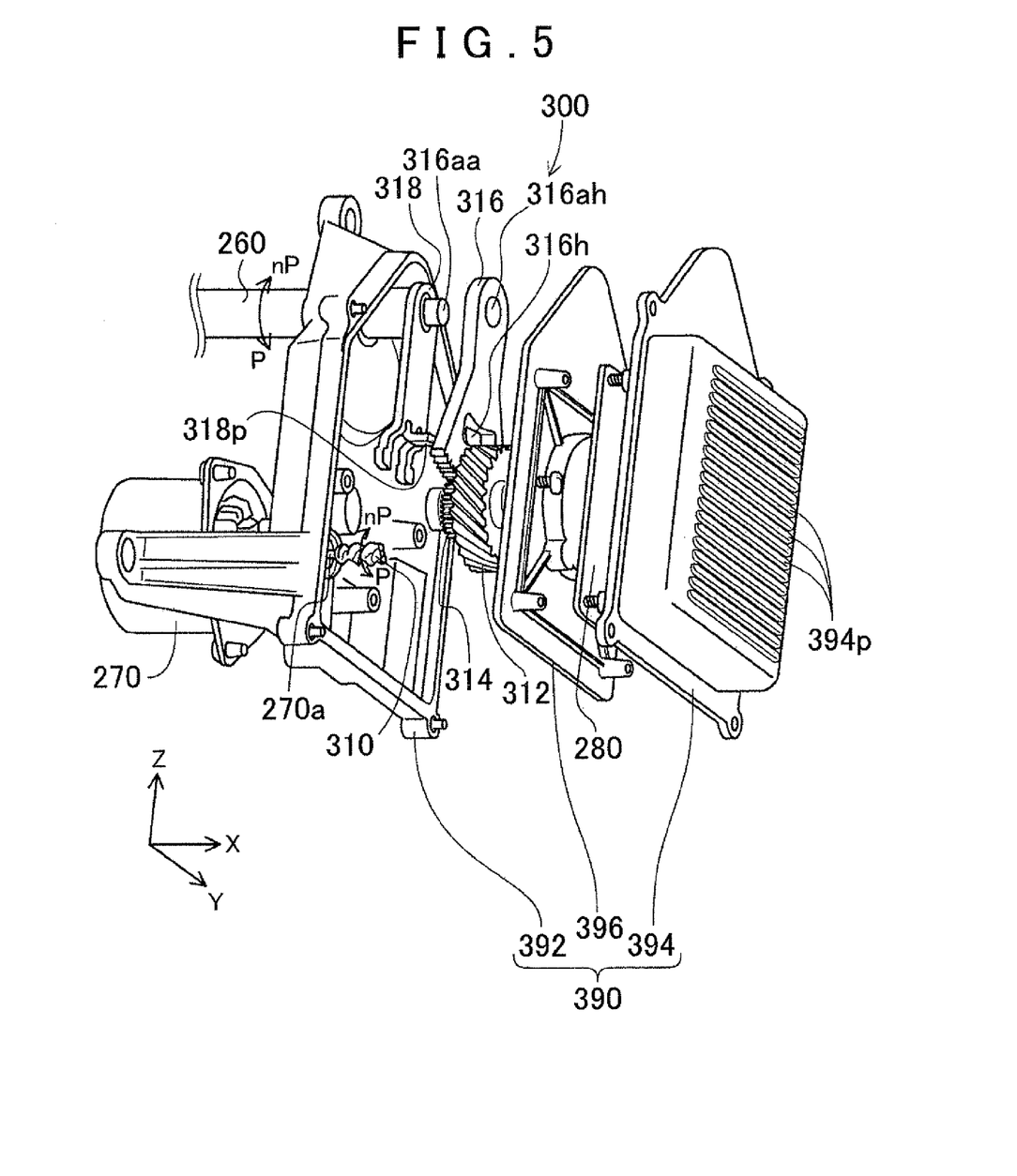
FIG. 5 is an exploded perspective view of a box 390 and elements housed in the box 390.
Figure 6:
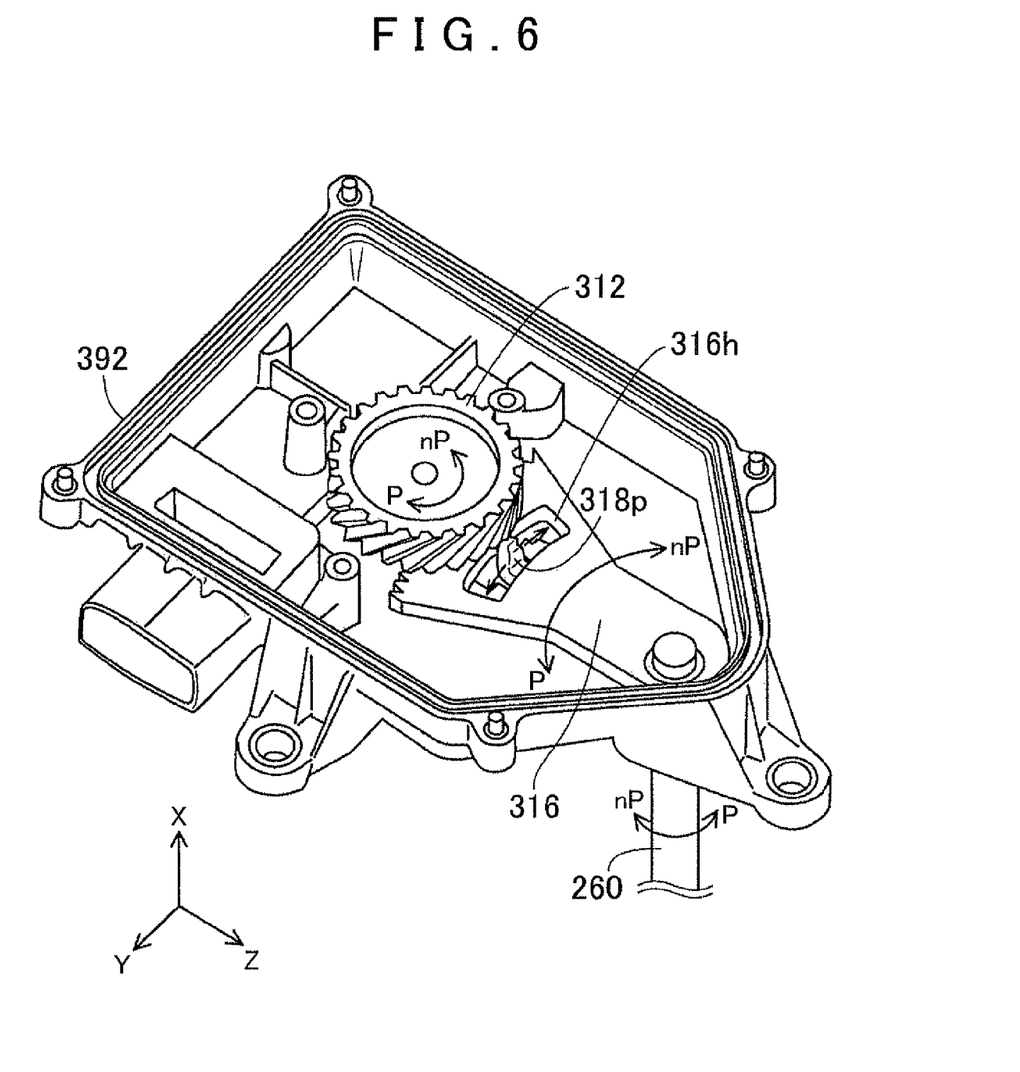
FIG. 6 is a perspective view showing a part of the box 390 on the −X side.

FIG. 5 is an exploded perspective view of the box 390 and elements housed in the box 390. FIG. 6 is a perspective view showing a part of the −X side of the box 390. As shown in the drawing, the box 390 has a first portion 392 that is fixed to the case 205 of the power transmission device 200, a second portion 394 that is fixed to the front side (+X side) of the first portion 392, and a plate 396 dividing the portions 392 and 394. The portions 392 and 394 have a container shape, and form a closed space by being fixed to each other. The plate 396 divides the space into two spaces. The control transmission mechanism 300 is arranged in the space surrounded by the first portion 392 and the plate 396. The driving circuit 280 is arranged in the space surrounded by the second portion 394 and the plate 396 (the driving circuit 280 is fixed to the front side (+X side) of the plate 396). The outer surface of the second portion 394 is formed with a plurality of convex portions 394p. The convex portions 394p serves as a heat releasing device of the driving circuit 280. Note that the second portion 394 is preferably formed of highly thermally conductive material (such as metal). Electrical wiring electrically connecting the driving circuit 280 to the electric motor 270 may run either inside or outside the box 390.

As shown in FIG. 5, the control transmission mechanism 300 has a first gear 312 that meshes with a gear 310 fixed to a rotating shaft 270a serving as an output shaft of the electric motor 270, a second gear 314 fixed to the first gear 312, a sector gear 316 meshing with the second gear 314, and an adjusting lever 318 having a projecting portion 318p inserted in a hole 316h of the sector gear 316. The adjusting lever 318 is fixed to the switching shaft 260.

The rotating shaft 270a of the electric motor 270 is in parallel with the switching shaft 260, and is arranged below (on the −Z side of) the switching shaft 260. The gear 310 is fixed to an end of the rotating shaft 270a. The first gear 312 meshing with the gear 310 of the motor is arranged above (on the +Z side of) the gear 310. The second gear 314 of a smaller diameter than that of the first gear 312 is fixed to the first gear 312 on the −X side. The rotational axis of the first gear 312 coincides with that of the second gear 314, and is in parallel with the rotating shaft 270a. Rotation of the rotating shaft 270a of the electric motor 270 rotates the gear 310 of the motor, and in turn, rotates the first gear 312 (and the second gear 314).

The sector gear 316 meshing with the second gear 314 is arranged above the second gear 314. The upper end of the sector gear 316 has a shaft hole 316ah that is coaxial with the switching shaft 260. The adjusting lever 318 is arranged on the −X side of the sector gear 316. The +X side of the adjusting lever 318 is provided with a shaft 316aa, onto which the shaft hole 316ah of the sector gear 316 is fit. The shaft 316aa rotatably supports the sector gear 316. The lower part of the sector gear 316 has a sector shape that is the wider the closer to the second gear 314. An end of the sector shape is provided with gear teeth meshing with the second gear 314. The hole 316h is formed near the center of the sector shape. The projecting portion 318p of the adjusting lever 318 is inserted in the hole 316h. Rotation of the second gear 314 (partially) rotates the sector gear 316 about the shaft hole 316ah. This rotation also rotates the hole 316h of the sector gear 316.

The (partial) rotation of the hole 316h of the sector gear 316 rotates also the projecting portion 318p (that is, the adjusting lever 318) in the same direction by making the projecting portion 318p in contact with an inner wall of the hole 316h. Because the adjusting lever 318 is fixed to the switching shaft 260, the rotation of the adjusting lever 318 rotates the switching shaft 260. Note that there is a displacement (play) by the size of the hole 316h between the rotation of the sector gear 316 and the rotation of the adjusting lever 318. However, the rotational position of the switching shaft 260 is accurately held in a predetermined position by the roller 257 shown in FIG. 4.

In this manner, the electric motor 270 can rotate the switching shaft 260 in each of the locking direction P and the unlocking direction nP. When the position of the shift lever 140 is switched to the parking range, the electronic control unit 130 (FIG. 1) controls the driving circuit 280 so as to rotate the rotating shaft 270a of the electric motor 270 in the locking direction P. When the position of the shift lever 140 is switched from the parking range to another range, the electronic control unit 130 controls the driving circuit 280 so as to rotate the rotating shaft 270a of the electric motor 270 in the unlocking direction nP.

As described above, in the present example, as shown in FIGS. 3A and 3B, the electric motor 270 for driving the switching shaft 260 is arranged not at an end of the switching shaft 260, but at a place that is separate and rearward from the switching shaft 260 and located in an obliquely lower position of the housing portion 205B (FIGS. 3 and 5). Accordingly, when compared with the case in which the electric motor 270 is provided at an end of (on the extended line from) the switching shaft 260, the electric motor 270 can be arranged in a position shifted in the direction (−X direction) opposite to the direction (+X direction) in which the switching shaft 260 projects. Specifically, in the present example, the electric motor 270 is arranged as follows. FIG. 3A shows a vertical line 209a. The vertical line 209a is a vertical line (a line parallel with the direction of gravity) passing through the portion 208a where the switching shaft 260 projects from the housing portion 205B. At least a part of the electric motor 270 is arranged on the case 205 side relative to the vertical line 209a (that is, at least a part of the electric motor 270 is arranged on the side in the opposite direction to the direction of moving away from the power transmission device 200. In the present example, at least a part of the electric motor 270 is arranged on the opposite side (−X side of the vertical line 209a) to the side (+X side of the vertical line 209a) toward which the switching shaft 260 projects). In addition, as shown in FIG. 3B, when viewed in the axial direction of the switching shaft 260 (in the present example, when viewed from the +X side toward the −X side), the electric motor 270 is arranged so as to overlap the housing portion 205B of the case 205. As a result of this arrangement, the size in the horizontal direction (here, in the X direction) of the power transmission device 200 can be smaller than in the case in which the electric motor 270 is provided at an end of (on the extended line from) the switching shaft 260. As a result, the degree of freedom in layout of the power transmission device 200 can be increased. In addition, in the present example, the power transmission device 200 can be reduced in size in the longitudinal direction when mounted on the vehicle 100. As a result, the possibility of intrusion of the power transmission device 200 into the passenger compartment can be reduced at the time of collision.

In this manner, in order to arrange the electric motor 270 in a position shifted to the case 205 side relative to the vertical line 209a passing through the portion 208a where the switching shaft 260 projects, the housing portion 205B of the case 205 of the power transmission device 200 may be used as illustrated in the present example. That is, in the present example, as shown in FIGS. 3A and 3B, the case 205 of the power transmission device 200 includes the housing portion 205B that serves as a portion for housing the generator 400. A device, such as the generator 400, that includes a rotating member (here, the rotor 420) often has a generally cylindrical shape. Accordingly, the housing portion 205B of the case 205 that houses such a device (here, the generator 400) can be formed into a generally convex shape like a side face of a cylinder. In the present example, when viewed in the axial direction of the rotational axis 422 of the rotating member (here, the rotor 420) (in the present example, for example, when viewed from the +Y side toward the −Y side), the housing portion 205B covers the generator 400 in the direction perpendicular to the rotational axis 422 of the rotor 420 (generator 400) (in FIGS. 3A and 3B, the left-hand portion of the generator 400). The shape (surface shape) of the housing portion 205B is a generally convex shape, in which the generator 400 is housed. The switching shaft 260 projects from the housing portion 205B (portion 208a). When viewed in the axial direction of the rotational axis 422 of the rotor 420, the electric motor 270 is arranged at a location facing, of the surface of the housing portion 205B, another portion 208b that does not overlap the portion 208a where the switching shaft 260 projects. With this arrangement, as shown in FIGS. 3A and 3B, at least a part of the electric motor 270 can easily be arranged on the case 205 side relative to the vertical line 209a.

Note that the portion of the surface of the housing portion 205B facing the electric motor 270 refers to a portion that is on the surface of the housing portion 205B and is closest to the electric motor 270.

In the present example, as shown in FIG. 5, the electric motor 270 is arranged on the −X side of the control transmission mechanism 300, whereas the driving circuit 280 is arranged on the opposite side (+X side) of the control transmission mechanism 300. Therefore, the electric motor 270 and the driving circuit 280 are physically separated from each other by the control transmission mechanism 300. As a result, conduction of heat between the electric motor 270 and the driving circuit 280 is suppressed. Therefore, it becomes less possible that the heat produced in one of the electric motor 270 and the driving circuit 280 increases the temperature of the other. Consequently, it is unnecessary to provide a large cooling device (such as a heat releasing device) so as to cool those elements 270 and 280. As a result, the possibility of increase in the size of the power transmission device 200 can be reduced.

In addition, in the present example, the switching shaft 260 is a rotating shaft that rotates to switch the operational state of the locking mechanism 250 as shown in FIG. 4, and the electric motor 270 has the rotating shaft (output shaft) 270a in parallel with the switching shaft 260 as shown in FIG. 5. Therefore, the structure of the control transmission mechanism 300 can be more simplified than in the case in which the rotating shaft 270a is arranged in a twisted position relative to the switching shaft 260. Consequently, the control transmission mechanism 300 can be downsized. As a result, the possibility of increase in the size of the power transmission device 200 can be reduced.

Moreover, in the present example, as shown in FIGS. 3A and 3B, the housing portion 205B of the case 205 is arranged on the side in the forward direction (+X direction) of the vehicle 100 relative to the power transmission device 200. In addition, the switching shaft 260 projects toward the side in the forward direction (+X direction) relative to the housing portion 205B, and the driving circuit 280 of the electric motor 270 is arranged on the side in the forward direction (+X direction) relative to the control transmission mechanism 300. Therefore, as shown in FIG. 2, when the vehicle 100 travels forward, the wind W1 flowing from the front of the vehicle 100 can cool the driving circuit 280. Consequently, it is unnecessary to provide a large cooling device (such as a heat releasing device) so as to cool the driving circuit 280. As a result, the possibility of increase in the size of the power transmission device 200 can be reduced. Note that the first wind W1 may pass through a radiator (not shown) that cools coolant of the internal combustion engine 110 and reach the power transmission device 200.

Furthermore, as shown in FIG. 3A, the housing portion 205B includes an inclined portion 208c that is inclined obliquely downward from the portion 208a where the switching shaft 260 projects toward the inside of the power transmission device 200 (in the opposite direction to the direction of moving away from the power transmission device 200). The electric motor 270 is arranged below the inclined portion 208c. As a result of this arrangement, as shown in FIG. 2, when the vehicle 100 travels forward, the wind W2 flowing between the vehicle 100 and the ground surface can cool the electric motor 270. Consequently, it is unnecessary to provide a large cooling device (such as a heat releasing device) so as to cool the electric motor 270. As a result, the possibility of increase in the size of the power transmission device 200 can be reduced.

B. Modification Examples

Note that among the constituent elements in the above-described example, the elements other than those claimed in the independent claim are additional elements, and can be omitted as appropriate. The present invention is not limited to the example or the embodiment described above, but can be implemented in various aspects to the extent of not departing from the gist of the invention. For example, the following modifications are possible.

First Modification Example

In the above-described example, the structure of the power transmission device 200 is not limited to the structure shown in FIGS. 1 to 6, but various other structures may be employed. For example, the electric motor 270 and the driving circuit 280 may be arranged on the same side of the control transmission mechanism 300 as each other. The driving circuit 280 may be arranged on the reverse side of the vehicle relative to the control transmission mechanism 300. The rotating shaft 270a of the electric motor 270 may be arranged in a twisted position relative to the switching shaft 260. The switching shaft 260 need not be in parallel with the forward direction of the vehicle. Even in this case, assuming that the direction of extension of the switching shaft 260 projecting from the case 205 is decomposed into X, Y, and Z components, if the forward directional (X directional) component has a positive value, the switching shaft 260 can be stated as projecting toward the side in the forward direction. Moreover, the housing portion 205B of the case 205 may be arranged on the reverse side of the vehicle 100 relative to the case 205. The electric motor 270 may be arranged above the portion 208a of the surface of the housing portion 205B where the switching shaft 260 projects. Furthermore, in the above-described example, at least some of the elements of the generator 400, the electric motor 500, and the differential gear 220 may be arranged outside the case 205 or may be provided separately from the power transmission device 200.

The structure of the locking mechanism 250 is not limited to the structure shown in FIG. 4, but may be any of various other structures.

The electric actuator for driving the switching shaft 260 is not limited to the electric motor 270, but may be any of various other actuators. For example, an electromagnetic solenoid actuator may be employed.

The motion of the switching shaft 260 is not limited to rotation, but may be any other motion. For example, the switching shaft 260 may slide.

The structure of the control transmission mechanism 300 is not limited to the structure shown in FIGS. 5 and 6, but various other structures can be employed. For example, the control transmission mechanism 300 may include a linkage mechanism or may be structured by only gears. In general, the control transmission mechanism 300 can employ any mechanism that associates movement of the electric actuator with movement of the switching shaft 260.

Second Modification Example

The power transmission device 200 is not limited to a power transmission device that uses a plurality of power sources such as the internal combustion engine 110 and the electric motor 500, but may be a power transmission device (such as an automatic transmission) that transmits power supplied from a single power source. The power transmission device may also be a multi-speed transmission. In this case, the operating mechanism that can have a plurality of operational states including a first operational state and a second operational state may be a shift range switching mechanism of the multi-speed transmission. In general, the shift range switching mechanism has a hydraulic control device that hydraulically controls a plurality of friction engagement elements of a speed change mechanism, a slide valve (also referred to as a manual shift valve) that controls a supply destination of hydraulic pressure in the hydraulic control device, and a spool of the slide valve. The spool may be connected to the switching shaft 260. The electric motor 270 and the control transmission mechanism 300 may be structured so as to slide the spool by rotating the switching shaft 260. Note that the operating mechanism that is switched in the operational state thereof by the switching shaft is not limited to the locking mechanism 250 and the shift range switching mechanism, but may be any operating mechanism that can have the plurality of operational states including the first operational state and the second operational state.

Third Modification Example

In the above-described example, the member of which at least a part is housed in the housing portion 205B is not limited to the generator 400, but may be any rotary member that rotates for power transmission (any device including such a rotary member). For example, the housing portion 205B may be a portion housing the electric motor 500 or a portion housing the differential gear 220. The housing portion 205B may also be a portion housing rotary members (such as a ring gear and a clutch plate) constituting a transmission (such as a multi-speed transmission or a continuously variable transmission). The housing portion may even house all rotary members. In any case, when viewed in the axial direction of the rotational axis of the rotary member, at least a part of the electric actuator is preferably arranged on the case side relative to the vertical line passing through the portion where the switching shaft projects from the housing portion (on the side in the opposite direction to the direction of moving away from the power transmission device, that is, on the side toward which the horizontal size of the power transmission device decreases).

Fourth Modification Example

In the above-described example, the shape (surface shape) of the housing portion 205B may be any generally convex shape when viewed in the axial direction of the rotational axis of the rotary member. For example, the shape of the housing portion 205B may be a polygonal shape (or a part of polygonal shape), a circular shape (or a circular arc shape), or an oval shape (or a part of oval shape).

In any case, when viewed in the axial direction of the rotational axis of the rotary member, the surface of the housing portion 205B may be provided with irregularities and steps that are smaller than a distance between a portion of the rotary member that is farthest away from the rotational axis of the rotary member and the rotational axis (the radius of rotation of the rotary member). Even if a convex shape that houses the rotary member is provided with small irregularities and steps as described above, the term "generally convex shape" includes such convex shape with small irregularities and steps. The generally convex shape includes both a convex shape and a shape obtained by providing the convex shape with small irregularities and steps.

The shape (surface shape) of the housing portion 205B is preferably a generally convex shape in which the direction of normal line to the surface gradually changes when viewed in the axial direction of the rotational axis of the rotary member. With this shape, the size of the housing portion 205B can be smaller than in the case in which a rectangular shape obtained from two intersecting straight lines (a shape in which the direction of normal line changes only once) is employed. Here, the direction of normal line may change continuously or through a plurality of steps.

In a cross section in parallel with the rotational axis of the rotary member, the surface of the housing portion 205B may include a portion that is not in parallel with the rotational axis of the rotary member. Also in this case, the shape (surface shape) of the housing portion 205B only needs to be a generally convex shape in a cross section perpendicular to the rotational axis of the rotary member. Also in this case, the shape of the housing portion 205B can be stated as a generally convex shape when viewed in parallel with the rotational axis of the rotary member. Here, the shape (surface shape) of the housing portion 205B is preferably a generally convex shape in any cross section perpendicular to the rotational axis of the rotary member.

However, the shape of the housing portion viewed in the axial direction of the rotational axis of the rotary member may be a different shape other than the generally convex shape. Also in this case, the electric actuator is preferably arranged as follows. That is, when viewed in the axial direction of the rotational axis of the rotary member, the electric actuator is arranged at a location facing, of the surface of the housing portion of the case, another portion that does not overlap the portion where the switching shaft projects. In addition, when viewed in the axial direction of the rotational axis of the rotary member, at least a part of the electric actuator is arranged on the case side relative to the vertical line passing through the portion where the switching shaft projects from the housing portion of the case. Moreover, when viewed in the axial direction of the switching shaft, at least a part of the electric actuator is arranged so as to overlap the housing portion of the case. By employing such an arrangement, it is possible to reduce a possibility of increase in the horizontal size of the power transmission device compared to the case in which the electric actuator is arranged on the extended line from the switching shaft.

The present invention may be applied to a power transmission device.

What is claimed is:

1. A power transmission device for a vehicle, comprising:
   a rotary member that rotates for transmitting power;
   an operating mechanism that is capable of having a plurality of operational states including a first operational state and a second operational state;
   a switching shaft that switches the operational state of the operating mechanism;
   an electric actuator that produces power for operating the switching shaft;
   a control transmission mechanism that transmits the power of the electric actuator to the switching shaft; and
   a case that houses at least the rotary member, the case comprises:
      an end portion that houses at least a part of the rotary member in a portion covering the rotary member in a direction parallel to a rotational axis of the rotary member, and
      a housing portion that houses at least a part of the rotary member in a portion covering the rotary member in a direction perpendicular to the rotational axis of the rotary member;
   wherein:
   the switching shaft projects from the housing portion of the case toward the outside of the housing portion;
   the electric actuator is arranged at a location facing a portion of a surface of the housing portion of the case that does not overlap another portion where the switching shaft projects, when viewed in the axial direction of the rotational axis of the rotary member;
   at least a part of the electric actuator is arranged on a side of a plane, the plane extending parallel to the rotational axis of the rotary member and oriented so as to intersect the housing portion of the case where the switching shaft projects from the case, and wherein the rotary member is located on the side of the plane; and
   at least a part of the electric actuator is arranged so as to overlap the housing portion of the case, when viewed in the axial direction of the switching shaft.

2. The power transmission device according to claim 1, wherein
   the switching shaft is a rotating shaft that rotates to switch the operational state of the operating mechanism, and
   the electric actuator includes an output rotating shaft that is in parallel with the switching shaft.

3. The power transmission device according to claim 2, further comprising:
   an actuator driving circuit that drives the electric actuator, wherein
   the electric actuator is arranged on one side of the control transmission mechanism, and
   the actuator driving circuit is arranged on the side opposite to the electric actuator with respect to the control transmission mechanism.

4. The power transmission device according to claim 3, wherein
   the power transmission device is mounted on a vehicle,
   the housing portion is arranged on a front side in a forward direction of the vehicle relative to the power transmission device,
   the switching shaft projects toward the front side in the forward direction relative to the housing portion, and
   the actuator driving circuit is arranged on the front side in the forward direction relative to the control transmission mechanism.

5. The power transmission device according to claim 4, wherein
   the housing portion of the case includes an inclined portion inclined obliquely downward from the portion where the switching shaft projects toward the inside of the power transmission device, when viewed in the axial direction of the rotational axis of the rotary member, and
   the electric actuator is arranged below the inclined portion of the housing portion.

6. The power transmission device according to claim 3, wherein
the housing portion of the case includes an inclined portion inclined obliquely downward from the portion where the switching shaft projects toward the inside of the power transmission device, when viewed in the axial direction of the rotational axis of the rotary member, and
the electric actuator is arranged below the inclined portion of the housing portion.

7. The power transmission device according to claim 2, wherein
the housing portion of the case includes an inclined portion inclined obliquely downward from the portion where the switching shaft projects toward the inside of the power transmission device, when viewed in the axial direction of the rotational axis of the rotary member, and
the electric actuator is arranged below the inclined portion of the housing portion.

8. The power transmission device according to claim 1, further comprising:
an actuator driving circuit that drives the electric actuator, wherein
the electric actuator is arranged on one side of the control transmission mechanism, and
the actuator driving circuit is arranged on the side opposite to the electric actuator with respect to the control transmission mechanism.

9. The power transmission device according to claim 8, wherein
the power transmission device is mounted on a vehicle,
the housing portion is arranged on a front side in a forward direction of the vehicle relative to the power transmission device,
the switching shaft projects toward the front side in the forward direction relative to the housing portion, and
the actuator driving circuit is arranged on the front side in the forward direction relative to the control transmission mechanism.

10. The power transmission device according to claim 9, wherein
the housing portion of the case includes an inclined portion inclined obliquely downward from the portion where the switching shaft projects toward the inside of the power transmission device, when viewed in the axial direction of the rotational axis of the rotary member, and
the electric actuator is arranged below the inclined portion of the housing portion.

11. The power transmission device according to claim 8, wherein
the housing portion of the case includes an inclined portion inclined obliquely downward from the portion where the switching shaft projects toward the inside of the power transmission device, when viewed in the axial direction of the rotational axis of the rotary member, and
the electric actuator is arranged below the inclined portion of the housing portion.

12. The power transmission device according to claim 1, wherein
the housing portion of the case includes an inclined portion inclined obliquely downward from the portion where the switching shaft projects toward the inside of the power transmission device, when viewed in the axial direction of the rotational axis of the rotary member, and
the electric actuator is arranged below the inclined portion of the housing portion.

* * * * *